United States Patent
Bowles et al.

(10) Patent No.: US 8,761,722 B1
(45) Date of Patent: Jun. 24, 2014

(54) ENHANCED LOCATION DATA IN EMERGENCY CALL HANDLING

(75) Inventors: Kevin D. Bowles, Lenexa, KS (US); Robert H. Burcham, Overland Park, KS (US); Jason R. Delker, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/616,958

(22) Filed: Sep. 14, 2012

(51) Int. Cl.
*H04M 11/04* (2006.01)

(52) U.S. Cl.
USPC ............... 455/404.2; 455/404.1; 455/550.1; 340/988

(58) Field of Classification Search
USPC ............... 455/404.2, 404.1, 550.1; 340/988
See application file for complete search history.

(56) References Cited

U.S. PATENT DOCUMENTS

| | | | |
|---|---|---|---|
| 7,245,900 B1 | 7/2007 | Lamb et al. | |
| 7,702,081 B1 | 4/2010 | Klesper et al. | |
| 7,702,308 B2 | 4/2010 | Rollender | |
| 7,715,821 B2 | 5/2010 | Rollender | |
| 7,764,944 B2 | 7/2010 | Rollender | |
| 2001/0021646 A1 | 9/2001 | Antonucci et al. | |
| 2007/0066273 A1* | 3/2007 | Laroia et al. | 455/343.2 |
| 2009/0063174 A1* | 3/2009 | Fricke | 705/1 |
| 2010/0246780 A1 | 9/2010 | Bakker et al. | |
| 2011/0026687 A1 | 2/2011 | Smelyansky | |
| 2012/0015622 A1* | 1/2012 | Kuz et al. | 455/404.2 |
| 2013/0069802 A1* | 3/2013 | Foghel et al. | 340/989 |

OTHER PUBLICATIONS

Kevin D. Bowles, et al., Patent Application entitled "Enhanced Emergency Call Mobility Support," filed Sep. 13, 2012, U.S. Appl. No. 13/615,565.

FAIPP Pre-Interview Communication dated Apr. 10, 2014, U.S. Appl. No. 13/615,565, filed on Sep. 13, 2012.

\* cited by examiner

*Primary Examiner* — Danh Le (57) ABSTRACT

A telematics unit for use in a vehicle. The telematics unit comprises a cellular radio transceiver operable for placing an emergency call in a wireless access network, a location data generating unit operable to determine and output enhanced location information about the vehicle location, a processor, a memory, and an application stored in the memory. When executed by the processor, the application builds an emergency call origination message, including at least some of the enhanced location information and transmits the emergency call origination message via the cellular radio transceiver.

20 Claims, 5 Drawing Sheets

ENHANCED LOCATION DATA IN EMERGENCY CALL HANDLING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Emergency calling involves a communication device dialing a short number to reach emergency help when an emergency is experienced. For example, in the United States '911' can be dialed by a communication device, and the telephone network is required by applicable regulations to connect that call to the appropriate public safety answering point (PSAP). Common carrier communication service providers need to comply with a variety of emergency calling regulations.

Mobile communication may involve a cell phone establishing a communication with one or more cell towers using a radio communication link, and the cell tower linking the call back through the wired communication network. As the cell phone moves, for example as a cell phone operated in a moving vehicle moves, a first cell tower may hand over the in-progress cellular call to a second cell tower that establishes a radio communication link with the cell phone. Cell phones may initiate emergency calls, and supporting the government regulations for emergency calls originating from cell phones poses some challenges not associated with wired and/or fixed location phones. Communication radios are now being provided in devices other than the traditional cell phone. For example, communication radios may be placed in telematics units and/or head units in motor vehicles.

SUMMARY

In an embodiment, a telematics unit for use in a vehicle is disclosed. The telematics unit comprises a cellular radio transceiver operable for placing an emergency call in a wireless access network, a location data generating unit operable to determine and output enhanced location information about the vehicle location, a processor, a memory, and an application stored in the memory. When executed by the processor, the application builds an emergency call origination message, including at least some of the enhanced location information and transmits the emergency call origination message via the cellular radio transceiver.

In an embodiment, a method of conducting an emergency call is disclosed. The method comprises determining by an enhanced location data engine enhanced location information associated with a vehicle that comprises two or more of a geographical location of the vehicle, a velocity of the vehicle, a heading of the vehicle, and a highway lane identification on which the vehicle is positioned. The method further comprises building an emergency call origination message by a telematics unit in the vehicle, wherein the message comprises the determined enhanced location information and wherein the telematics unit comprises a cellular radio transceiver and transmitting the emergency call origination message by the cellular radio transceiver.

In an embodiment, a method of handling an emergency call is disclosed. The method comprises receiving an emergency call origination electronic message at a public safety answering point (PSAP), processing the message electronically to extract enhanced location information associated with a telematics unit in a vehicle that sent the origination electronic message, wherein the enhanced location information comprises at least two of a geographical location of the vehicle, a velocity of the vehicle, a heading of the vehicle, and a highway lane identification on which the vehicle is positioned, and providing the enhanced location information to first responders.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, a mobile station that encapsulates enhanced location information in an emergency call as well as a public safety answering point (PSAP) that parses and uses the enhanced location information are disclosed. The mobile station may comprise a telematics unit or a head unit in a vehicle such as a car or a truck. The telematics unit may comprise a location engine that determines a variety of vehicle location information that is referred to as enhanced location information herein. The enhanced location information may comprise location coordinates information, velocity information, heading or direction information, highway identification information, and other information associated with the vehicle.

The location engine may determine a location and then update the location based on inputs such as angular orientation of the front wheels, a rate of revolution of the front wheels, a known relationship between the revolution of the front wheels and a distance traveled. The location engine may determine a highway that the vehicle is driving on and may determine a lane direction of the vehicle on the subject highway. For example, the location engine may determine that the vehicle is in the northbound lanes of I-35.

The location engine may output the enhanced location information to an emergency calling application that executes on a processor of the telematics unit. When a user of the vehicle initiates an emergency call, for example an E-911 call, the emergency calling application builds an emergency call origination message comprising the enhanced location information. The emergency call origination message is transmitted into the network and propagates to the serving public safety answering point. The public safety answering point parses the enhanced location information and may pass the information on to first responders, for example to an ambulance crew. The first responders may use the enhanced location information to find the vehicle promptly and respond appropriately. For example, an ambulance, having the enhanced location information associated with a vehicle involved in an accident may pull off at the appropriate exit to most rapidly access the accident site, possibly saving precious minutes in response delay. In an embodiment, the telematics unit, while connected to the public safety answering point in an emergency call, may periodically send updates of enhanced location information to the public safety answering point. Alternatively, the public safety answering point may request and receive updates of enhanced location information from the telematics unit.

Figure 1:
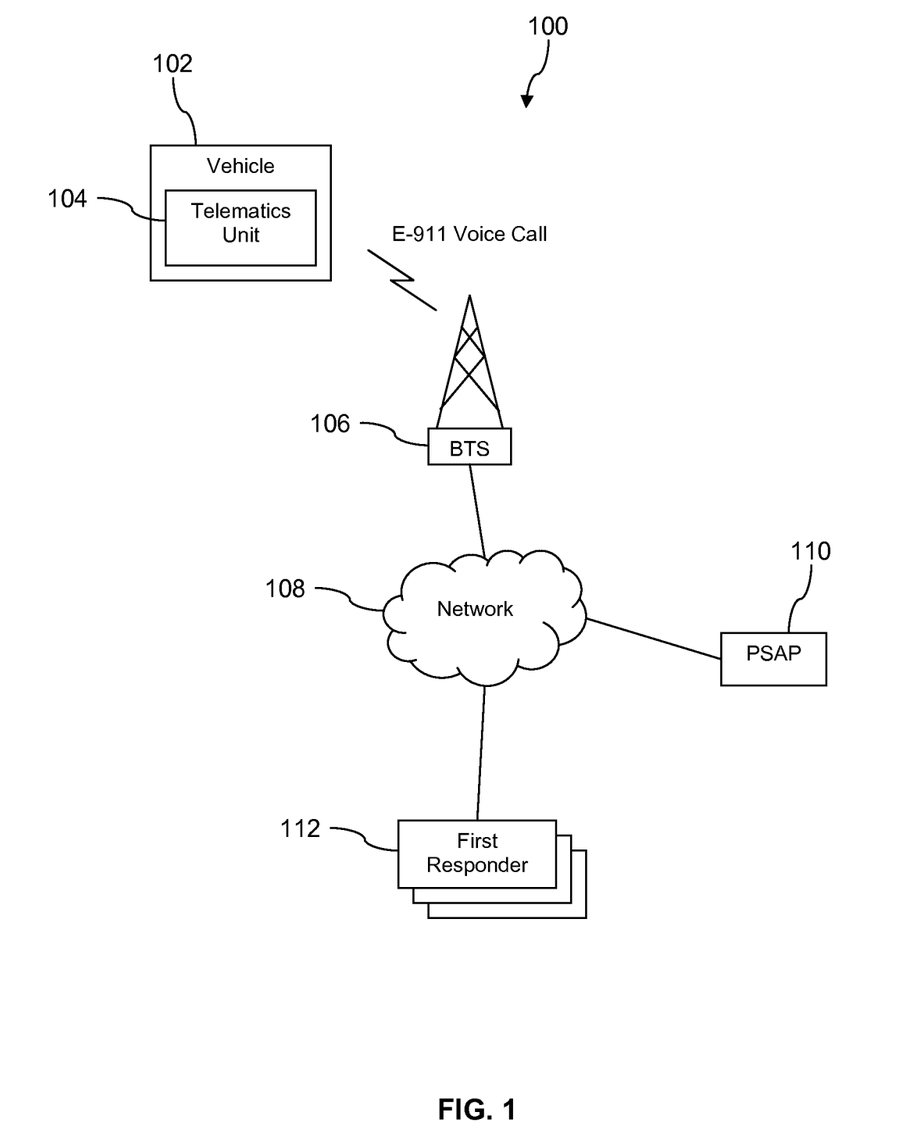
FIG. 1 is an illustration of a communication system according to an embodiment of the disclosure.

Turning now to FIG. 1, a system 100 is described. In an embodiment, the system 100 comprises a telematics unit 104 or head unit located in a vehicle 102. The telematics unit 104 may establish a wireless communication link, for example to complete an emergency call or an E-911 call, with a base transceiver station 106. The base transceiver station 106 may be coupled to a network 108. The system 100 further comprises a public safety answering point (PSAP) 110 that is coupled to the network 108. In an embodiment, the public safety answering point 110 may communicate with one or more first responders 112 via the network 108. The network 108 may comprise one or more public communication networks, one or more private communication networks, or a combination thereof. The vehicle 102 may be an automobile, a pick-up truck, an eighteen-wheeler truck, a mid-sized truck, a motorcycle, a boat, or other vehicle. In an embodiment, the telematics unit 104 and the public safety answering point 110 may be partially implemented as computer systems. Computer systems are discussed further hereinafter.

The telematics unit 104 may be commanded by a user, for example a driver of the vehicle 102, to place an emergency call. The user may press a dedicated emergency call button on a control head of the telematics unit 104 to initiate such an emergency call. Alternatively, the user may activate a soft button, a touch screen button on a display of the control head of the telematics unit 104, or speak a voice command to a voice-based input of the telematics unit 104. The telematics unit 104 may build an emergency call origination message including enhanced location information associated with the location of the vehicle 102 and transmit this to the base transceiver station 106, directing the call to a short code representing an emergency call, for example a short string of digits such as '911'. The base transceiver station 106 and call handling systems within the network 108 may be operable to selectively handle such an emergency call with elevated priority and to determine an appropriate public safety answering point 110 to direct the emergency call to. Once connected, the emergency call provides a voice communication link between the telematics unit 104 and the public safety answering point 110 via the base transceiver station 106 and the network 108.

Figure 2:
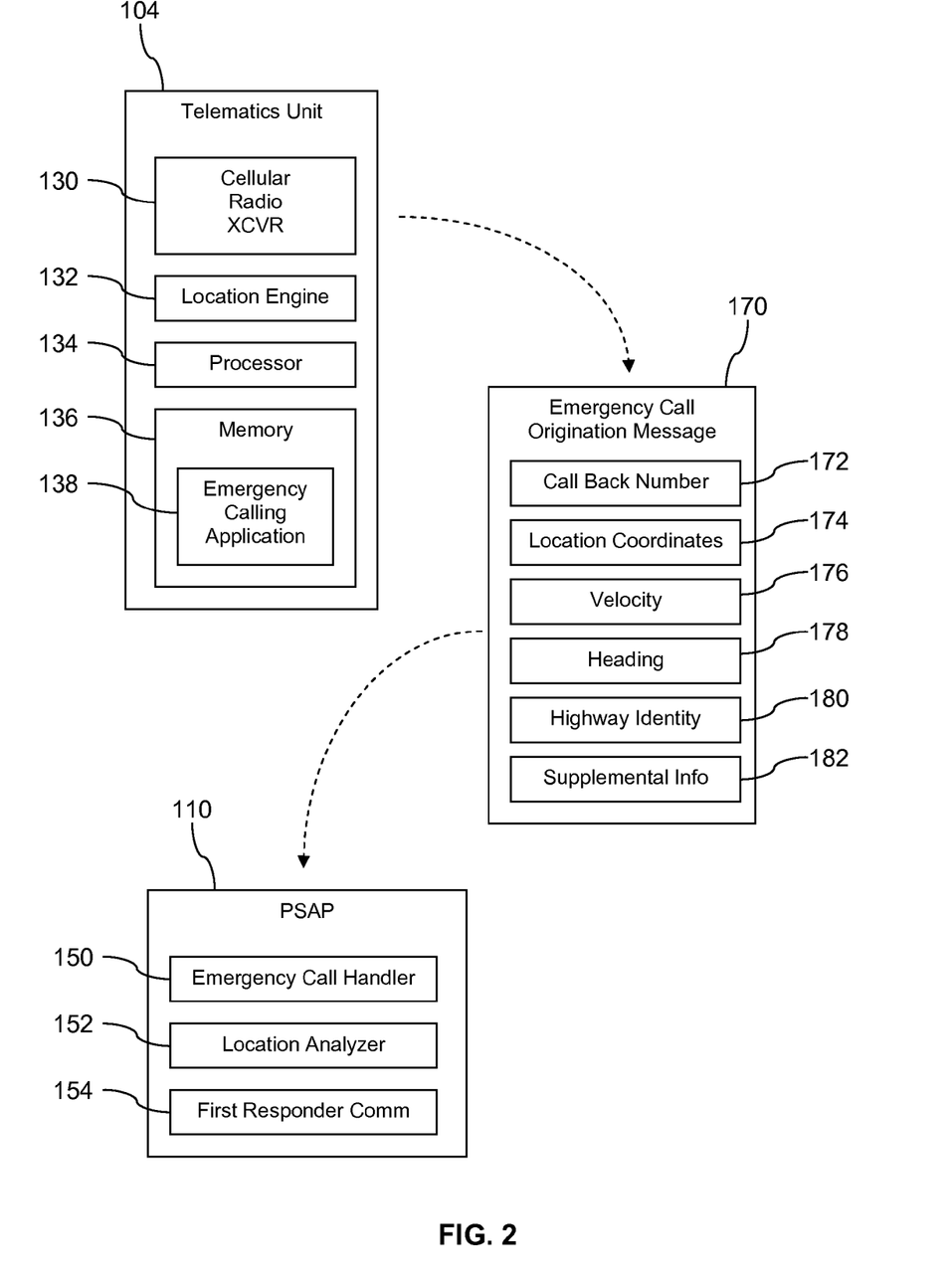
FIG. 2 is an illustration of a telematics unit and a public safety answering point (PSAP) according to an embodiment of the disclosure.

Turning now to FIG. 2, further details of an embodiment of the telematics unit 104 and the public safety answering point 110 are described. In an embodiment, the telematics unit 104 comprises a cellular radio transceiver 130, a location engine 132, a processor 134, and a memory 136 storing an emergency calling application 138. The public safety answering point 110 may comprise an emergency call handler application 150, a location analyzer 152, and a first responder communication application 154. The cellular radio transceiver 130 may be operable to communicate with the base transceiver station 106 based on one or more of a code division multiple access (CDMA), global system for mobile communications (GSM), long term evolution (LTE), or worldwide interoperability for microwave access (WiMAX) wireless communication protocol. When the telematics unit 104 is commanded to connect an emergency call, the emergency calling application 138 stored in the memory 136 may be executed by the processor 134.

The location engine 132 may be an application that executes in the telematics unit 104, for example is executed by the processor 134. Alternatively, the location engine 132 may be provided as an electronic box, separate from the telematics unit 104, that provides inputs to the telematics unit 104. The location engine 132 may determine and store a location of the vehicle 102, which may be referred to in some contexts as determining a location fix of the vehicle 102. The location fix may be determined based on inputs from a global positioning system (GPS) receiver that is integrated with the location engine 132 or that is coupled to the location engine 132. The location of the vehicle 102 may be stored as a pair of GPS coordinates. Alternatively, the location of the vehicle 102 may be stored as a pair of standard latitude coordinate and longitude coordinate.

The location engine 132 may update the location fix of the vehicle 102 continuously or at a periodic rate, while updates from the GPS receiver are available. There may be conditions, however, under which the GPS receiver cannot determine GPS coordinates due to environmental constraints. For example, in some locations GPS satellite signals may not be available or received with sufficient strength, for example when driving through a tunnel, when heavy precipitation is occurring, when driving under dense forest canopy, or for other reasons.

To provide for intervals of time when the GPS cannot provide location coordinates, the location engine 132 may employ analytical methods and inputs from vehicle sensors to calculate location fix updates, which may be referred to in some context as dead reckoning. For example, the location engine 132 may calculate a location fix based on the previous location fix, a time interval since the previous location fix was determined, and an average velocity over the time interval. The average velocity may itself be determined based on a number of revolutions of a wheel of the vehicle 102, a known circumference of the wheel, and the time interval. Alternatively, the average velocity that is calculated to provide a speed indication to a driver of the vehicle 102, for example on a speedometer display, may be used to calculate position fix updates. It will be appreciated that other methods of determining the average velocity over the time interval may be used in calculating the location fix. When location coordinate updates are again available from the GPS receiver, the GPS receiver may reassume the responsibility for updating the location fix.

The location engine 132 may output the location fix as well as other location information or information related to the location of the vehicle 102 to the telematics unit 104. For example, the location engine 132 may output the velocity, an identity of the highway that the vehicle 102 is travelling on, a magnetic heading of the vehicle 102, and supplemental information such as whether the vehicle is driving in northbound lanes or southbound lanes of the subject highway. The location engine 132 may determine the highway that the vehicle 102 is travelling on based on comparing the location fix to a predefined map of highways that is stored by the location engine 132.

The emergency calling application 138 may build an emergency call origination message 170 comprising enhanced location information when attempting to connect an emergency call, for example an E-911 call. The emergency call origination message 170 may comprise a call back number 172, a pair of location coordinates 174, a velocity 176, a a heading 178, a highway identity 180, and optionally supplemental information 182. The location coordinates 174 identify the location of the vehicle as a point on the surface of the earth, within some suitable limits of accuracy. The velocity 176 identifies a velocity of the vehicle 102. The heading 178 identifies a heading or direction in which the vehicle 102 is travelling. The highway identity 180 may identify a highway by name, for example I-35 or interstate 35 or Kansas state highway 183 or the like. The supplemental information may comprise identification of a lane that the vehicle 102 is traveling in or other information. In an embodiment, one or more of 172, 174, 176, 178, 180, and 182 may be provided as tags, fields, parameters, or other structures within the emergency call origination message 170. In an embodiment, some of the information 172, 174, 176, 178, 180, 182 may be carried in existing message formats, for example in an existing location info field. In another embodiment, however, the information 172, 174, 176, 178, 180, 182 may be carried in the emergency call origination message 170 in a different structure.

In an embodiment, the telematics unit 104 does not provide the call back number 172 in the emergency call origination message 170, for example when the telematics unit 104 is not associated with a dialable phone number. In this case a call back number may be supplied by a network node in the network 108 that processes the emergency call origination message 170 before propagating it to the public safety answering point 110. For further information about providing a call back number for the telematics unit 104 in the emergency call origination message 170 when the telematics unit 104 is associated with a non-dialable phone number, see U.S. patent application Ser. No. 13/615,565 filed Sep. 13, 2012 and entitled "Enhanced Emergency Call Mobility Support," by Kevin D. Bowles, et al, which is incorporated by reference herein for all purposes. In an embodiment, the emergency call origination message 170 does not comprise all of the information 174, 176, 178, 180, 182. In an embodiment, the emergency call origination message 170 comprises two or more of the information 174, 176, 178, 180, 182.

Figure 3:
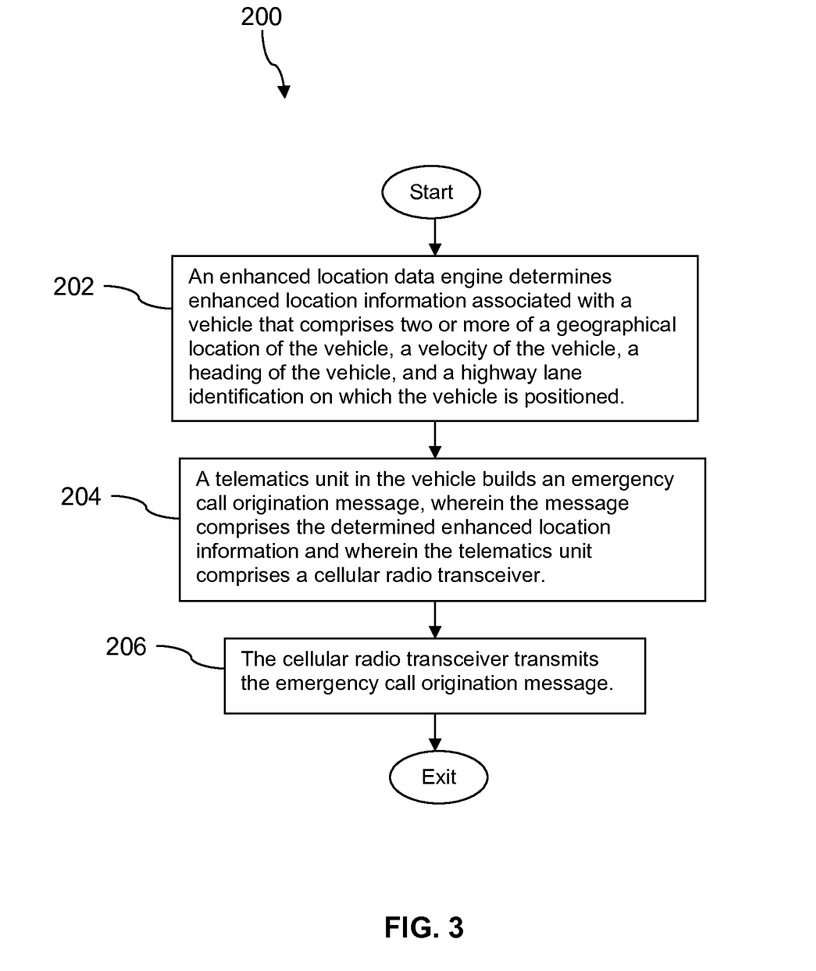
FIG. 3 is a flow chart of a method according to an embodiment of the disclosure.

Turning now to FIG. 3, a method 200 is described. At block 202, determine enhanced location information associated with a vehicle by an enhanced location data engine that comprises two or more of a geographical location of the vehicle, a velocity of the vehicle, a heading of the vehicle, and a highway lane identification on which the vehicle is positioned. At block 204, build an emergency call origination message by a telematics unit in the vehicle, wherein the message comprises the determined enhanced location information and wherein the telematics unit comprises a cellular radio transceiver. At block 206, transmit the emergency call origination message by the cellular radio transceiver. For example, transmit the emergency call origination message 170 to addressed to a short code or E-911 number. The network 108 will automatically manage routing the emergency call origination message 170 to the appropriate public safety answering point 110 for handling the emergency call.

Figure 4:
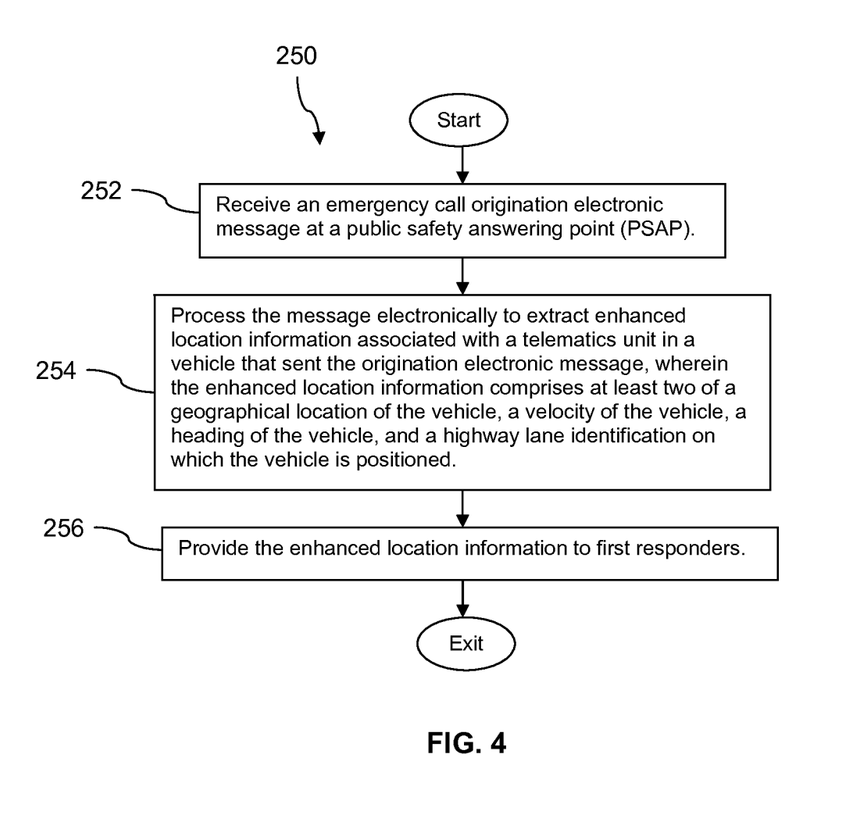
FIG. 4 is a flow chart of another method according to an embodiment of the disclosure.

Turning now to FIG. 4, a method 250 is described. At block 252, an emergency call origination electronic message is received at a public safety answering point (PSAP). For example, the emergency call origination message 170 is received by the public safety answering point 110. At block 254, the message is processed electronically to extract enhanced location information associated with a telematics unit in a vehicle that sent the origination electronic message, wherein the enhanced location information comprises at least two of a geographical location of the vehicle, a velocity of the vehicle, a heading of the vehicle, and a highway lane identification on which the vehicle is positioned. For example, the emergency call handler application 150 connects an emergency voice call to the telematics unit 104 via the network 108 and the base transceiver station 106, and the location analyzer 152 parses or extracts the enhanced location information from the emergency call origination message 170. At block 256, the enhanced location information is provided to first responders 112. For example, the first responder communication application 154 electronically transmits at least some of the enhanced location information to one or more first responders 112. By sending the enhanced location information electronically, the first responders 112 may be able to feed the enhanced location information into one or more electronic tools, for example an electronic navigation system.

Figure 5:
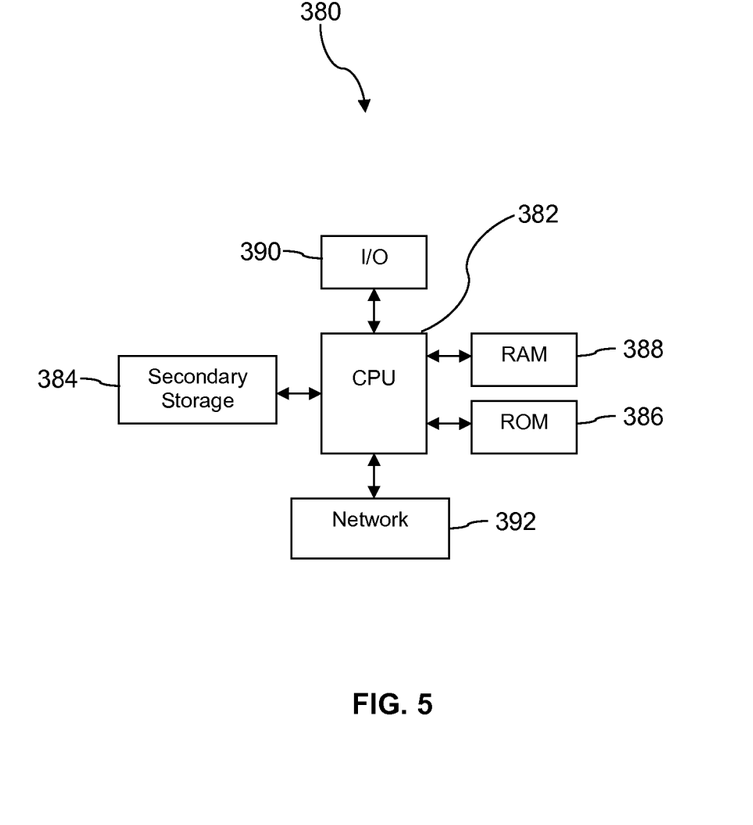
FIG. 5 is a block diagram of a computer system according to an embodiment of the disclosure.

FIG. 5 illustrates a computer system 380 suitable for implementing one or more embodiments disclosed herein. For example, the telematics unit 102 and the public safety answering point 110 may be implemented, at least in part, in a form similar to the computer system 380. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A telematics unit for use in a vehicle, comprising:
   a cellular radio transceiver operable for placing an emergency call in a wireless access network;
   a location data generating unit operable to determine and output enhanced location information about the vehicle location;
   a processor;
   a memory; and
   an application stored in the memory that, when executed by the processor,
      builds an emergency call origination message, including at least some of the enhanced location information, wherein the at least some of the enhanced location information comprises an identification of a highway on which the vehicle is travelling,
      transmits the emergency call origination message via the cellular radio transceiver to a public safety answering point, and
      periodically transmits updates of the enhanced location information to the public safety answering point while connected to the public safety answering point in the emergency call.

2. The telematics unit of claim 1, wherein the emergency call origination message initiates an E911 emergency call.

3. The telematics unit of claim 1, wherein the enhanced location information comprises location coordinates of the vehicle.

4. The telematics unit of claim 1, wherein the enhanced location information comprises a velocity of the vehicle.

5. The telematics unit of claim 1, wherein the application further builds location update messages that comprise the enhanced location information output by the location data generating unit and transmits location update messages to the public safety answering point handling the emergency call.

6. The telematics unit of claim 1, wherein the cellular radio transceiver is operable to wirelessly communicate according to at least one of code division multiple access, global system for mobile communications, long term evolution, or worldwide interoperability for microwave access.

7. The telematics unit of claim 1, wherein the identification of a highway on which the vehicle is travelling is determined by the location engine based on comparing a location fix of the vehicle to a stored predefined map of highways.

8. The telematics unit of claim 1, wherein the at least some of the enhanced location information further comprises a highway lane identification on which the vehicle is positioned.

9. A method of conducting an emergency call, comprising:
   determining by an enhanced location data engine enhanced location information associated with a vehicle that comprises two or more of a geographical location of the vehicle, a velocity of the vehicle, a heading of the vehicle, and a highway lane identification on which the vehicle is positioned;
   building an emergency call origination message by a telematics unit in the vehicle, wherein the message comprises the determined enhanced location information and wherein the telematics unit comprises a cellular radio transceiver;
   transmitting the emergency call origination message by the cellular radio transceiver, wherein after receiving the emergency call origination message at a public safety answering point, the determined enhanced location information is provided to first responders;
   automatically determining a travel route for the first responders based on the determined enhanced location information; and
   transmitting the travel route to a communication device associated with the first responders, wherein the communication device is operable to present a map of the travel route.

10. The method of claim 9, wherein the enhanced location data engine determines updated enhanced location information associated with the vehicle, transmitting enhanced location information updates to the public safety answering point.

11. The method of claim 10, further comprising building an emergency call location update message in response to receiving a request from the public safety answering point for updated location information.

12. The method of claim 10, further comprising building an emergency call location update message periodically.

13. The method of claim 10, further comprising building an emergency call location update message in response to a user input to the telematics unit.

14. The method of claim 9, wherein the emergency call origination message established an E-911 emergency call.

15. The method of claim 9, the cellular radio transceiver is operable to wirelessly communicate according to at least one of code division multiple access, global system for mobile communications, long term evolution, or worldwide interoperability for microwave access.

16. The method of claim 9, wherein the first responders comprise an ambulance.

17. The method of claim 9, wherein the first responders comprise a police car.

18. The method of claim 9, wherein the first responders comprise a fire truck.

19. The method of claim 9, wherein the first responders comprise a helicopter.

20. A method of handling an emergency call, comprising:
receiving an emergency call origination message at a public safety answering point, wherein the emergency call origination message is built by a telematics unit that comprises a cellular radio transceiver in a vehicle and comprises enhanced location information determined by an enhanced location data engine associated with the vehicle, and wherein the determined enhanced location information comprises two or more of a geographical location of the vehicle, a velocity of the vehicle, a heading of the vehicle, and a highway lane identification on which the vehicle is positioned;
after receiving the emergency call origination message at the public safety answering point, providing the determined enhanced location information to first responders;
automatically determining a travel route for the first responders based on the determined enhanced location information; and
transmitting the travel route to a communication device associated with the first responders, wherein the communication device is operable to present a map of the travel route.

* * * * *